US010783201B2

(12) United States Patent
Gavrielides et al.

(10) Patent No.: US 10,783,201 B2
(45) Date of Patent: Sep. 22, 2020

(54) CUSTOMIZED NEWS ALERTS BASED ON CONTACTS

(71) Applicant: Covve Visual Network Ltd., Nicosia (CY)

(72) Inventors: Yiannis Gavrielides, Nicosia (CY); Alexandros Protogerellis, Nicosia (CY)

(73) Assignee: Covve Visual Network Ltd., Nicosia (CY)

( * ) Notice: Subject to any disclaimer, the term of this patent is extended or adjusted under 35 U.S.C. 154(b) by 290 days.

(21) Appl. No.: 16/024,157

(22) Filed: Jun. 29, 2018

(65) Prior Publication Data
US 2019/0034539 A1 Jan. 31, 2019

Related U.S. Application Data

(60) Provisional application No. 62/536,528, filed on Jul. 25, 2017.

(51) Int. Cl.
G06F 16/174 (2019.01)
G06F 16/2457 (2019.01)
G06F 16/27 (2019.01)
G06F 16/9535 (2019.01)
G06F 16/958 (2019.01)
H04L 29/12 (2006.01)

(52) U.S. Cl.
CPC ...... G06F 16/9535 (2019.01); G06F 16/1748 (2019.01); G06F 16/24578 (2019.01); G06F 16/27 (2019.01); G06F 16/958 (2019.01); H04L 61/1552 (2013.01); H04L 61/1594 (2013.01)

(58) Field of Classification Search
CPC ............ G06F 16/9535; G06F 16/9536; G06F 16/9538; G06F 16/273; G06F 16/275; G06F 16/278; G06F 16/27; G06F 16/958; G06F 16/1748; G06F 16/24578; H04L 61/1594; H04L 61/1552
See application file for complete search history.

(56) References Cited

U.S. PATENT DOCUMENTS 7,765,265 B1 * 7/2010 Granito ................ G06Q 10/107
707/999.003
7,966,369 B1 6/2011 Briere
(Continued)

Primary Examiner — Jorge A Casanova
(74) Attorney, Agent, or Firm — Han Santos, PLLC

(57) ABSTRACT

Techniques are disclosed herein for providing customized news alerts for a user's contacts in a network environment via a news delivery service that includes a synchronization service for synchronizing contact information in the user's address books. Relevant newsworthy aspects can be extracted using a contact distillation service. Distilled contacts data is normalized or generalized using a data normalization service. The news delivery service also includes a news ingestion and analysis service for obtaining news feeds from various data sources. News articles or posts in the news feeds are analyzed to determine a priority score that can be used to match the articles or posts with a specific contact in the address books based at least partially on the distilled and normalized data using a news-to-contact matching and prioritization service. Matched articles and contacts can be displayed to the user via an application user interface for transmission to the contacts.

20 Claims, 3 Drawing Sheets

(56) References Cited

U.S. PATENT DOCUMENTS

| | | | |
|---|---|---|---|
| 2002/0116396 A1 | 8/2002 | Somers | |
| 2006/0167942 A1* | 7/2006 | Lucas | G06Q 30/02 |
| 2011/0137940 A1 | 6/2011 | Gradin | |
| 2012/0079004 A1 | 3/2012 | Herman | |
| 2012/0102153 A1 | 4/2012 | Kemp | |
| 2012/0272160 A1 | 10/2012 | Spivack | |
| 2014/0089306 A1* | 3/2014 | Rana | G06F 16/24578 |
| | | | 707/731 |
| 2014/0245180 A1* | 8/2014 | Kuramura | G06Q 10/10 |
| | | | 715/753 |
| 2014/0280134 A1* | 9/2014 | Horen | G06Q 50/01 |
| | | | 707/736 |
| 2014/0280329 A1 | 9/2014 | Beechuk | |
| 2016/0350812 A1* | 12/2016 | Priness | G06Q 30/0269 |
| 2018/0225081 A1* | 8/2018 | Dange | G06F 16/639 |

* cited by examiner

CUSTOMIZED NEWS ALERTS BASED ON CONTACTS

CROSS-REFERENCE TO RELATED APPLICATIONS

This application claims the benefit of U.S. Provisional Patent Application No. 62/536,528 filed Jul. 25, 2017, which is hereby incorporated by reference in its entirety.

BACKGROUND OF THE INVENTION

Sharing exclusive news and time sensitive information can be of great importance and value for many professionals and businesses. Generally, news and information relating to current events can be disseminated readily online. Particularly, individuals can visit a variety of news-related sites, web blogs, social media, and/or other online publishers. To receive the most updated content from a particular news-related site, web blog, social media, and/or other online publishers, individuals can subscribe to Really Simple Syndication (RSS) feed to be notified of new and changed content. RSS provides very basic information in order from newest to oldest by utilizing RSS aggregator programs that automatically check a series of RSS feeds for new items on an ongoing basis, making it possible to keep track of changes to multiple websites. Upon detecting any changes, the RSS aggregator program can provide notifications to a subscriber. In cases where RSS feeds or links are not available for a website, third party services can be used to convert any website to an RSS feed on the fly and deliver content to the subscriber in a feed reader. These third-party services typically examine and extract posts from websites using HTML scrapping techniques to create an RSS feed. If RSS is not functional, an RSS feed validator is used to check a feed for errors. In this regard, various workarounds are required to receive news headlines and changes from various websites. While RSS is operable to provide notifications about news headlines and changes to websites, RSS feeds rely on individual users or subscribers to subscribe to particular websites.

Moreover, abundance of news articles makes it difficult for subscribers to sort through stories that are truly relevant or of interest to them or their contacts as news websites and blogs typically cover a wide variety of topics. In this regard, RSS feeds typically do not provide means for filtering certain stories or posts that may be highly relevant to a particular individual. In certain circumstances, individuals may receive shared links to particular news articles or stories from their contacts and vice versa. Because RSS feeds deliver updates to individual subscribers, existing methods of delivering news are limited to delivering news to those individuals directly (i.e., without intervention from third parties) after the individuals visit a particular news site, web blog, social media, and/or other online publishers to review the contents thereon and/or receive subscriptions therefrom. In this way, the existing methods of delivering news provides little to no opportunities for an individual's social network to interact with the individual regarding news material that may be relevant or important to the individual.

SUMMARY OF THE INVENTION

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as to prelude to the more detailed description that is disclosed later.

Techniques are disclosed herein for providing customized news alerts that may be relevant to a user's contacts in the user's address book in a network environment. In various embodiments, the network environment comprises one or more computing devices having one or more processors in communication with a memory unit having instructions or code segments stored thereon, the processors executing the instructions or code segments to result in a news delivery application comprising a synchronization service, contact distillation service, data normalization service, news-to-contact matching and prioritization service, news prioritization service, news ingestion and analysis service, and/or so forth.

The application comprises an application user interface that is accessible via one or more user devices operated by a user. The synchronization service accesses the user's address book residing locally on the one or more user devices and/or other address books (i.e., supported via cloud services) that may be remotely controlled via the one or more user devices to synchronize the address books with a contacts database. The contact distillation service distills newsworthy aspects of each contact based on contact information associated with each contact in the address books. For example, the contact distillation service can identify each contact's location, company, and/or industry of service. The data normalization service normalizes the distilled contact information and relays the distilled and normalized contact data to a datastore for managing contact data relating to companies, industries, and/or location-based information.

The news ingestion and analysis service obtains news feeds from various data sources in the network, wherein the data sources can comprise RSS feeds, news networks, social media networks, and/or so forth. In this regard, various data mining techniques can be employed for obtaining news feeds. The news prioritization service prioritizes news stories based on predetermined parameters. In various embodiments, the news prioritization service can incorporate a scoring scheme to give weight to each news article or story based on predetermined parameters. For example, the scoring scheme can include assigning gravity scores depending on the relevancy and/or credibility of a news article received in the news feed. The scoring scheme can also include assigning urgency scores depending on the time sensitivity, subject matter, and/or impact factor of the article. The gravity scores and the urgency scores can be weighed based on predetermined parameters.

The news to contact and matching prioritization service analyzes news feeds and contact information in order to match news stories to specific contacts in the user's address books. In various embodiments artificial intelligence modules can be used to employ machine learning algorithm that identify best matches. If there are matches, the news to contact matching and prioritization service transmits alerts or notifications to the user via the user device. The notification can include a link to a matched news article and the user's contact. Additionally, the notification can prompt the user to send the link to the user's contact, for example, via SMS and/or email. If the link is shared, the news to contact matching and prioritization service can store the matching news story and the contact information in a contact news store or other data stores to train machine learning models to determine future news to contact matches.

DETAILED DESCRIPTION OF THE INVENTION

Example Architecture

Figure 1:
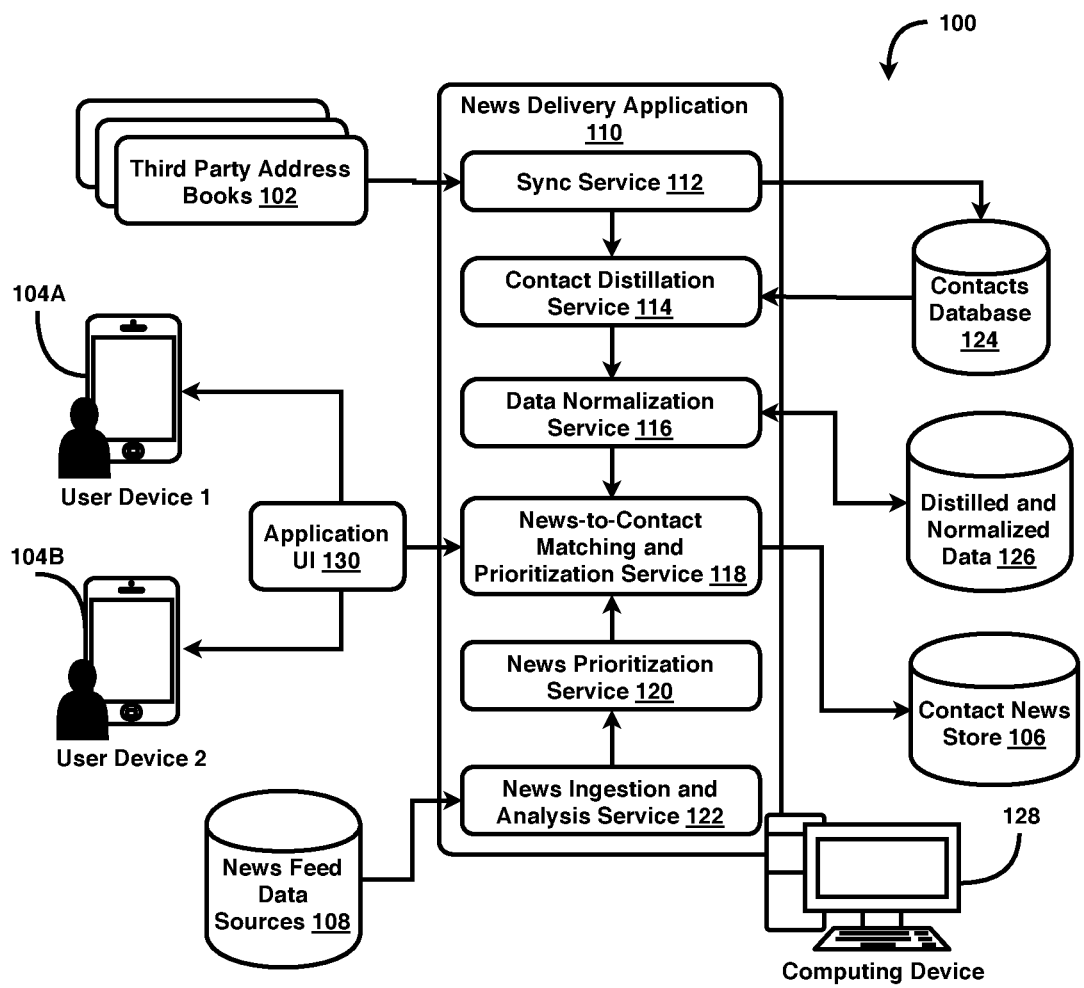
FIG. 1 depicts an exemplary system architecture for consolidating news feeds and applying filters based at least on data derived from a user's contacts list in order to selectively deliver news alerts to one or more contacts in the user's contacts list.

Referring now to FIG. 1, there are shown an example system architecture for providing customized news alerts. Various embodiments of the architecture 100 comprise one or more user devices 104A, 104B and one or more computing devices 128 (e.g., servers) in connection with a network. The network can be a cellular network that implements 2G, 3G, 4G, and long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), WiMax, and WiFi access technologies. In various embodiments, the computing devices 128 may include general purpose computers, such as desktop computers, tablet computers, laptop computers, servers, and so forth. However, in other embodiments, the computing devices 128 may be in the form of virtual machines, such as virtual engines (VE) and virtual private servers (VPS). The computing devices 128 may store data in a distributed storage system, in which data may be stored for long periods of time and replicated to guarantee reliability. Accordingly, the computing devices 128 may provide data and processing redundancy, in which data processing and data storage may be scaled in response to demand. Further, in a networked deployment, new computing devices 128 may be added on the fly without affecting the operational integrity of the system.

The user devices 104A, 104B comprise smart phones, mobile devices, tablet computers, personal digital assistants (PDAs), and/or other electronic devices having a wireless communication function that are capable of receiving inputs, processing the inputs, and generating output data. The user devices 104A, 104B are connected to a telecommunication network utilizing one or more wireless base stations or any other common wireless or wireline network access technologies. In one embodiment, the system and method of the present invention are taught and disclosed in terms of mobile computing. It should be understood, however, that the same principles are applicable to nearly any device capable of executing a machine-readable instruction.

The computing device 128 is configured to execute a news delivery application 110. The news delivery application 110 can comprise a mobile application, a web application, a website, a plug-in, an extension, and/or other non-downloadable or downloadable applications that reside on the user devices 104A, 104B, in part or in whole. The news delivery application 110 comprises a synchronization service 112, a contact distillation service 114, a data normalization service 116, a news-to-contact matching and prioritization service 118, a news prioritization service 120, and a news ingestion and analysis service 122. In various embodiments, the news delivery application 110 comprises an application user interface 130 (e.g., graphical user interface (GUI)) for enabling users to provide input (e.g., customized settings), receive output (e.g., notifications), and/or otherwise interact with one or more components of the news delivery application 110.

The synchronization service 112 is configured to synchronize one or more address books in a bi-directional manner, wherein each of the address books is associated with a user of one or more user devices 104A, 104B that owns or controls the address books. The address books comprise contacts lists. Without limitation, the address books can comprise information such as names, phone numbers, addresses, email addresses, uniform resource locator (URL) or domain name, job titles, affiliated organizations, and/or so forth, for each of the contacts in the contacts list. Information related to the user's contacts can also be derived from third party address books 102 (e.g., social media platforms, email address books, etc.) and/or obtained from an address book residing on the one or more user devices 104A, 104B. The address books are synchronized to a contacts database 124 in a bi-directional manner via a synchronization service 112, whereby the contacts database 124 can be operatively connected to the computing device 128. In various embodiments, the contacts database 124 can be integral to the computing device 128. The contacts database 124 is configured to manage data related to contacts contained within the address books. In various embodiments, the contacts database 124 can check for and retrieve newly available data pertaining to the address books on a scheduled basis. The contacts database 124 can collect and handle data based on configurable policies. For example, a configurable policy may specify the source data location, frequency of data retrieval, data retention period, and data disposal following an expiration of the data retention period. In various embodiments, the contacts database 124 can be a relational database, an object-oriented database, a columnar database, and/or so forth.

It is noted that, consistent with current privacy laws, the synchronization service 112 can comprise a privacy module (not pictured) to provide a user interface that enables each user of user devices 104A, 104B to select or unselect the type of data related to the user's contacts that may be collected by the synchronization service 112. With the use of such a privacy module, the user can safeguard his or her privacy and the contacts' privacy. In certain circumstances, regardless of whether a user has consented to the collection of a specific type of data related to contacts contained within the user's address books, the synchronization service 112 can be configured to only collect the specific type of data when it is legal to do so in the corresponding legal jurisdiction. In this regard, the synchronization service 112 can use a database of privacy rules and regulations to determine the types of data that it is permitted to collect under the applicable privacy rules and regulations. Accordingly, the synchronization service 112 can refrain from or suspend the collection of one or more specific types of data when the collection is prohibited by the privacy rules and regulations.

Information related to each of the contacts within the address books is distilled via a contact distillation service 114. The contact distillation 114 service analyzes each of the contact information to parse relevant information such as a contact's location, affiliation, job title, and/or so forth that can comprise newsworthy features. For instance, the contact distillation service 114 can determine the location of a contact using the contact's address such that the contact can be matched with a news article pertaining to that location. In another example, the contact distillation service 114 can identify one or more organizations that is affiliated with the contact (e.g., the contact's company) using the domain name of the contact's work email address such that the contact can be matched with a news article pertaining to that organization. In another example, the contact distillation service 114 can identify one or more industries that is associated with the contact using the contact's job title such that the contact can be matched with a news article pertaining to that job title the industry to which the job title is related. Distilled contact information can be prioritized based on predefined parameters. For example, location information can be prioritized over company information in order to give more weight to matching news story that pertain to location attributes with a contact.

Distilled contact information for each contact is passed to a data normalization service 116, which applies data normalization techniques for various contact information (e.g., company information, location information, and industries information) in order to generate distilled and normalized contact data 126 (i.e., standard keywords, identifiers, and/or other common contact information template or description schema), thus providing compatible data fields for comparing contact information obtained from different address books and streamlining data analysis when obtaining news feeds and matching relevant news stories to a specific contact in an address book. In various embodiments, data normalization can be accomplished by stemming, abbreviating, attempting spelling correction, and/or so forth. For instance, stemming allows to the news delivery application 110 to collect contact information regardless of variations and misspellings. Additionally, contact information can be spell-checked or type-checked via spelling correction utilizing dictionaries. One of ordinary skill in the art will appreciate, however, that data normalization may be conducted in any number of appropriate ways. The distilled and normalized contact data 126 can be stored in a data store, wherein the data store can be configured as a relational database, an object-oriented database, and/or a columnar database, or any configuration to support distilled and normalized contact data storage.

The news ingestion and analysis service 122 obtains news feeds from various data sources 108, including, without limitation, third party services/databases, and other types of sources, including news sites, web blogs, social media sites, and/or other online publishers. In various embodiments, the news delivery application 110 can interface with an application programming interface (API) (e.g., REST news API) for accessing structured data from news websites. Additionally, or alternatively, the news ingestion and analysis service 122 can utilize web crawlers or similar types of data aggregation means for obtaining news and/or other online publications. In this regard, the news ingestion and analysis service 122 can check for and retrieve newly available news feeds, data pertaining to news articles, and/or other online publications on a scheduled basis from various news feed sources 108. The news ingestion and analysis service 122 can collect and handle news feeds and/or related data based on configurable policies. For example, a configurable policy may specify the source data location, frequency of data retrieval, data retention period, and data disposal following an expiration of the data retention period.

Each news feed is processed to identify newsworthy articles or stories that are relevant to one or more contacts in a user's address book. More specifically, upon receiving news feeds from one or more data sources 108, the news ingestion and analysis service 122 can implement a data mining algorithm to extract words, terms, phrases, quotes, comments, tags, categories, and/or other attributes that are relevant to the distilled and normalized contact data 126. The data mining algorithm may use both machine learning and non-machine learning techniques such as decision tree learning, association rule learning, artificial neural networks, inductive logic, Support Vector Machines (SVMs), clustering, Bayesian networks, reinforcement learning, representation learning, similarity and metric learning, and sparse dictionary learning to extract patterns. In one example, the data mining algorithm may discover a pattern of articles about a specific location as relevant to the same location in the distilled and normalized contact data 126. In another example, the data mining algorithm may discover a pattern of blog entries about a specific company as relevant to the same company in the distilled and normalized contact data 126. Additionally, the news ingestion and analysis service 122 can consolidate articles about the same story from multiple news sources in order to minimize redundancy.

Based at least upon the extracted words, terms, phrases, quotes, comments, tags, categories, and/or other attributes, the news prioritization service 120 assigns a gravity score and an urgency score to the corresponding news story or article. In this regard, the news prioritization service 120 can include a scoring module (not pictured). Gravity scores and urgency scores can comprise a quantitative variable or a rated value on a scale, depending upon embodiments. In various embodiments, the weight of the gravity scores and the urgency scores can be based on predetermined parameters, for example, as defined by a user or an administrative entity that maintain or control the news delivery application 110. For instance, gravity scores can be given more weight than urgency scores and vice versa. Additionally, gravity scores and urgency scores can be given the same amount of weight. Without limitation, the gravity scores can depend on factors such as the source of the news story or article, credibility of the source and/or the author, number of views, shares, or "likes," relevancy, or any combination thereof. In this regard, a high gravity score indicates that the corresponding news story or article is widely viewed and/or more likely to be from a credible source than a news story or article having a corresponding low gravity score. Without limitation, the urgency scores can depend on factors such as the number of people affected, time sensitivity, subject matter of the article, or any combination thereof. For example, the news prioritization service 120 can assign greater urgency scores to stories that affect more than a predetermined number of people. Additionally, or alternatively, the news prioritization service 120 can assign a greater urgency scores to stories that are time sensitive. Finally, the news prioritization service 120 can assign a greater urgency scores to stories that pertain to certain topics. In this regard, greater urgency scores indicate that the corresponding news story or article is urgent and time sensitive.

Based on the gravity scores and the urgency scores, the news-to-contact matching and prioritization service 118 determines the final priority score for each news story or article and matches articles to specific contacts in the address books based at least partially on the distilled and normalized data 126 associated with the contacts. In various embodiments, the final priority score is the average of the gravity score and the urgency score. One of ordinary skill in the art will appreciate, however, that the final priority score may be calculated in any number of appropriate ways. The news-to-contact matching and prioritization service 118 matches an article to contacts at least partially based on the final priority score corresponding to the article. In various embodiments, only articles comprising a final priority score that is greater or equal to a predetermined value can be matched with a contact.

In various embodiments, the news-to-contact matching and prioritization service 118 can match a news article to a contact in an address book via affinity pairing. In this regard, the strength of a match between a news article and a contact can be quantified via an affinity coefficient, wherein if the affinity coefficient exceeds a predefined value or threshold, the news article matches the contact. For example, if a contact resides in Tokyo and a news story includes pertains to an earthquake in Tokyo, the affinity coefficient can exceed a predefined value or threshold to determine a match. In this way, the news-to-contact matching and prioritization service 118 can match a contact residing in Tokyo to a news story about an earthquake in Tokyo. In another example, the news-to-contact matching and prioritization service 118 can match a contact working for Company A to a news story about Company A if the affinity coefficient is greater than a predetermined value or threshold.

In yet another example, the news-to-contact matching and prioritization service 118 can determine that the affinity coefficient is less than a predetermined value or threshold if a contact is located in London, and a news article pertains to an event in Beijing. Thus, the news article about an event in Beijing is not relevant to the contact in London. In certain circumstances, a single news article can contain multiple attributes that the news-to-contact matching and prioritization service 118 can analyze in order to determine the affinity coefficient. For instance, a contact can be located in London, and a news article pertains to an event in Beijing. However, the contact can work for Company A that has an office located in Beijing. Accordingly, the news-to-contact matching and prioritization service 118 can still determine that the affinity coefficient is greater than a predetermined value to match the article about an event in Beijing with a contact that resides in London. In various embodiments, machine learning algorithm can be applied to determine best matches.

Additionally, the news-to-contact matching and prioritization service 118 delivers news alerts to the user device 104A, 104B based at least partially on user preferences. In this regard, the news-to-contact matching and prioritization service 118 comprises a notification module (not pictured). The notification module can prompt the user of one or more user devices 104A, 104B via the application user interface 130 to share a matched news story with the user's contacts. In various embodiments, the notification module can display a badge or a dialogue box with a link to the news story and display or identify the user's contact that is matched with the news story. The badge or the dialogue box can ask the user of the user device 104A, 104B to share the news article with the matched contact or ignore the news article. In turn, the user may share the article by selecting a share option or ignore the news article by selecting a dismiss option of the badge or the dialogue box. In this way, the user can be given an opportunity to determine whether the news article was correctly matched with the user's contact. Upon receiving a user input for sharing the article, the news-to-contact matching and prioritization service 118 can transmit the link to the news article to the user's contact via SMS, email, and/or so forth.

In various embodiments, a user can customize a news alert setting to notify the user only when the final priority score is greater than a predetermined value. Additionally, or alternatively, the user can customize a news alert setting to notify the user only when a news story is matched with certain contacts. In this way, not all of the user's contacts in the user's address book is matched with a news article. In various embodiments, the user can also provide feedback by "liking" a suggested match or "disliking" a suggested match. In this regard, the news-to-contact matching and prioritization service 118 can display a dialogue box that asks the user to rate the match on a scale or otherwise indicate whether the matched story was relevant to the matched contact. Data pertaining to the resulting match (e.g., a link to a news article and a contact) and the user's feedback are stored in the contact news store 106. This data can be used to provide additional training data sets and/or training results to train one or more machine learning models to automatically match news articles to contacts.

Example Computing Device

Figure 2:
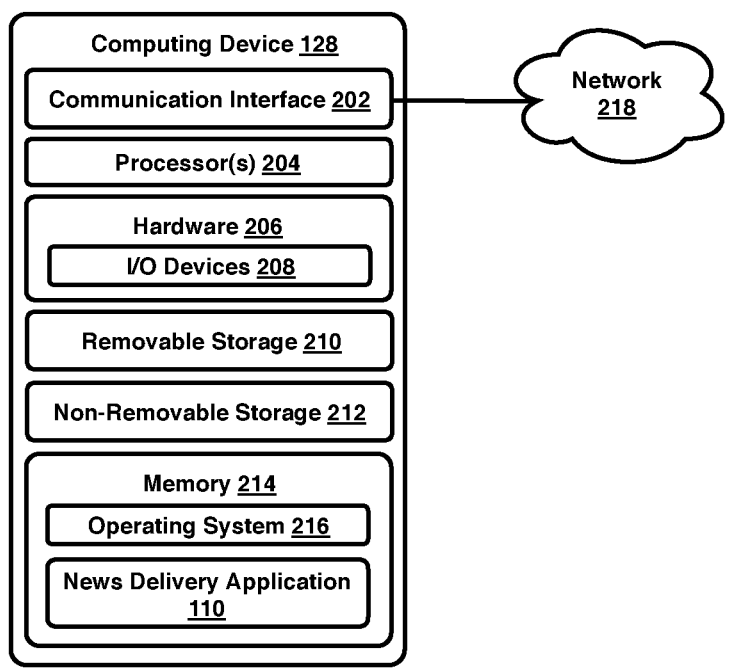
FIG. 2 shows a block diagram of various components of an illustrative network-enabled computing device that provides customized news alerts and selective news delivery.

Referring now to FIG. 2, there is shown a component level view of a computing device 128 associated with a news delivery application, in accordance with embodiments of the disclosure. It is noted that the computing device 128 as described herein can operate with more or less of the components shown herein. Additionally, the computing device 128 as shown herein or portions thereof can serve as a representation of one or more of the computing devices of the present system. The computing device can include a communication interface 202, one or more processors 204, hardware 206, and memory unit 214. The communication interface 202 includes wireless and/or wired communication components that enable the computing device 128 to transmit data to and receive data from other networked devices in a network 218 such as user devices as shown in FIG. 1.

The hardware 206 can include additional user interface, data communication, or data storage hardware. For example, the hardware components 206 include input/output (I/O) devices 208. In various embodiments, the I/O devices 208 can include any sort of output devices known in the art, such as a display (e.g., a liquid crystal display), speakers, a vibrating mechanism, or a tactile feedback mechanism. Output devices also include ports for one or more peripheral devices, such as headphones, peripheral speakers, or a peripheral display. In various embodiments, the I/O devices 208 include any sort of input devices known in the art. for example, input devices may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The computing device 128 further comprises one or more processors 204. The processors 204 can comprise a central processing unit (CPU), a graphics processing unit (GPU), or both CPU and GPU, or any other sort of processing unit.

The computing device 128 further comprises a system memory 214, wherein the memory 214 may be implemented using computer-readable media, such as computer storage media. Computer-readable media includes, at least, two types of computer-readable media, namely computer storage media and communications media. Computer storage media includes volatile, non-volatile, or some combination of the two. Computer storage media can also include additional data storage devices (e.g., removable storage 210 and/or non-removable storage 212) implemented in any method or technology for storage of information, such as computer readable instructions, code segments, data structures, program modules, or other data. Thus, computer-readable storage media include, but are not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing device 128. Any such tangible computer-readable media may be part of the computing device 128. In contrast, communication media may embody computer-readable instructions, code segments, data structures, program modules, or other data in a modulated data signal, such as a carrier wave, or other transmission mechanisms. The memory 214 may also include a firewall. In some embodiments, the firewall may be implemented as hardware 206 in the computing device 128.

The processors 204 and the memory 214 can implement an operating system 216 and the news delivery application 110. Other modules or data (not pictured) stored in the system memory 214 can comprise any sort of applications or platform components of the computing device 128, as well as data associated with such applications or platform components. The operating system 216 can include components that enable the computing device 128 to receive and transmit data via interfaces (e.g., user controls, communication interface, and/or input/output devices), as well as process data using the processors 204 to generate output. The operating system 216 can include a presentation component that presents the output (e.g., display the data on an electronic display, store the data in memory, transmit the data to another electronic device, etc.). Additionally, the operating system 216 can include other components that perform various additional functions generally associated with an operating system.

The news delivery application 110 can include the synchronization service, contact distillation service, data normalization service, news-to-contact matching and prioritization service, news prioritization service, and/or the news ingestion and analysis service described above in detail with regard to FIG. 1. The news delivery application 110 obtains contact information from a user's address books and receives news feed from various data sources. In various embodiments, the news delivery application 110 can leverage one or more trained machine learning model via an artificial intelligence module to analyze news articles or other online publications to determine whether at least one of the news articles or online publications is relevant to one or more contacts in the user's address book.

The artificial intelligence module can implement model training modules that uses a machine learning training pipeline comprising one or more training datasets for training and/or augmenting machine learning models from a training corpus. If one or more news stories is relevant to at least one of the user's contacts and meets the user's preferences, the user receives a notification (e.g., push notifications, banner notifications, etc.) on the user device. Upon receiving the notification, the user can share the matched news story to the user's contact as a way of keeping in touch with the user's contact or to inform the user's contact of the relevant news. Additionally, the user can provide feedback to the application 110 upon receiving the notification, which can be used to augment the datasets for the machine learning models.

Example Process

Figure 3:
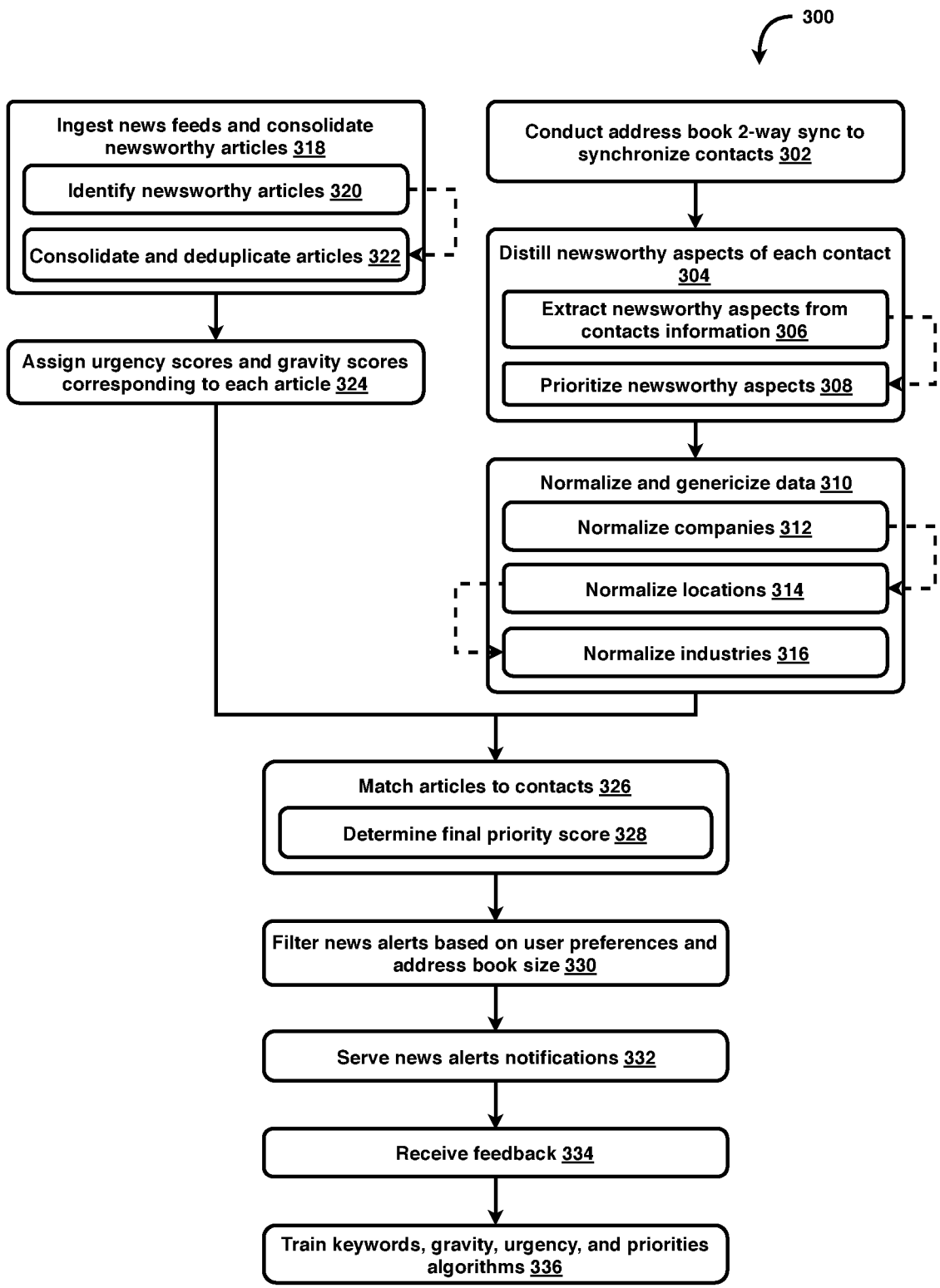
FIG. 3 is a flow diagram of an example process for providing customized news alerts and selectively delivering news contents to one or more contacts derived from one or more address books associated with at least one user.

FIG. 3 presents an illustrative process 300 for selectively delivering news articles, based at least partially on contact information derived from one or more address books. The process 300 is illustrated as a collection of blocks in a logical flow chart, which represents a sequence of operations that can be implemented in hardware, software, or a combination thereof. In the context of software, the block can represent computer-executable instructions or code segments that, when executed by one or more processors, perform the recited operations. Generally, computer-executable instructions or code segments may include routines, programs, objects, components, data structures, and the like that performs particular functions or implement particular abstract data types. The order in which the operations are described herein is not intended to be construed as a limitation, and any number of the described blocks can be combined in any order and/or in parallel to implement the process. For discussion purposes. The process 300 is described with reference to the architecture 100 of FIG. 1.

At block 302, the news delivery application, via the synchronization service, conducts a two-way synchronization of one or more address books to synchronize contacts in the address books. In this regard, the synchronization service can transmit a request to a user to access the user's address books in order to synchronize the address books and thus the contact information associated with each of the contacts in the address books in a contacts database. In various embodiments, the user can designate exempt contacts in the address books so as to prevent the synchronization service from obtaining and synchronizing contact information for particular contacts in the user's address books. In this way, the user can maintain privacy for one or more contacts in the user's address books.

At block 304, the news delivery application, via the contact distillation service, distills newsworthy aspects of each contact in the address books using contact information. In various embodiments, newsworthy aspects can be pre-defined by a user or an administrative entity. For example, the news delivery application can provide, via the contact distillation service, a user interface comprising a dialogue box that includes a list of newsworthy aspects and a check box or a toggle button that correspond to each newsworthy aspect, wherein the check box or the toggle button can be selected or unselected to indicate whether that newsworthy aspect can be considered for identifying relevant news articles to contacts. Thus, newsworthy aspects can comprise contact information such as the contact's location, company, and/or industry. If a check box corresponding to the contact's location is selected, then the contact's location for the contacts in the address books are extracted via the contacts distillation service.

Distilling newsworthy aspects of each contact includes extracting newsworthy aspects or information for contacts 306 and prioritizing the newsworthy aspects as indicated in block 308. Each newsworthy aspect can be given weight according to a default setting, depending upon embodiments. Additionally, one or more newsworthy aspects can be added. For instance, a contact's language preference can be added as a newsworthy aspect to share news articles in the language of the contact's preference. At block 310, the data normalization service normalizes and/or genericize data. In this regard, various data normalization techniques can be used. Preferably, each of the identified newsworthy aspects is normalized and/or genericized. For example, normalizing includes the steps of receiving data related to companies 312, normalize locations 314, and/or normalizing industries 316. Accordingly, data normalization applies to new and/or added newsworthy aspects for each contact.

At block 318, the news ingestion and analysis service obtains news feeds and consolidates newsworthy articles from various data sources. More specifically, obtaining includes identifying newsworthy articles 320. Newsworthiness of news articles can be based on whether the articles comprise one or more newsworthy attributes as defined by predetermined parameters. For example, a news article can be newsworthy based on words, terms, phrases, quotes, comments, tags, categories, and/or other attributes associated to the article. Additionally, consolidating newsworthy articles includes identifying two or more articles pertaining to the same story and deduplicating the articles 322. In this regard, the news ingestion and analysis service can select a single source of the news article. For example, the news ingestion and analysis service can select the source based on the popularity of the source and/or the credibility of the source. At block 324, the news prioritization service assigns urgency scores and gravity scores to a news article in order to calculate the article's final priority score. Preferably, if multiple articles are deduplicated, the deduplicated article comprises a single urgency score and a single gravity score, wherein the urgency score can be an average of the urgency scores of the multiple articles and the gravity score can be an average of the gravity scores of the multiple articles. One of ordinary skill in the art will appreciate, however, that urgency scores and gravity scores may be calculated in any number of appropriate ways.

At block 326, the news-to-contact matching and prioritization service matches articles to contacts. Matching includes calculating a final priority score 328 for a news article based on the urgency scores and the gravity scores. In this regard, the news-to-contact matching and prioritization service determines whether the final priority score is greater or less than a specified value. If the final priority score is greater than the specified value then the article corresponding to the score can be matched with a contact. Additionally, or alternatively, the articles are matched to contacts based at least partially on an affinity coefficient. At block 330, the news-to-contact matching and prioritization service filter news alerts based on user preferences and/or address book size 330. The user preferences can specify the frequency of notification, the method of delivery of notifications for one or more contacts, and/or so forth. For instance, if a user's address book comprises more than a predetermined number of contacts, the user can opt to receive notifications on a scheduled basis.

At block 332, the news-to-contact matching and prioritization service serves news alerts notification to one or more user devices. The notifications can be displayed as a dialogue window, a badge, and/or so forth. In various embodiments, the notifications can be delivered to the user via email, SMS, and/or other messaging means, wherein the email, SMS, and/or other messaging means can comprise a preloaded message to the contact. At block 334, the news delivery application receives feedback from the user. For instance, the news delivery application can display a dialogue window that prompts the user to rate the match or indicate whether the matched article was relevant to the user's contact. Upon receiving the user's feedback, the news delivery application can utilize the feedback data to increase training datasets when implementing machine learning algorithms to train keywords, gravity, urgency, and priorities algorithms 336.

CONCLUSION

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

The invention claimed is:

1. A system, comprising:
one or more non-transitory storage mediums configured to provide stored code segments, the one or more non-transitory storage mediums coupled to one or more processors, each configured to execute the code segments and causing the one or more processors to:
request synchronization of one or more address books operated by a user associated with a user device, wherein the one or more address books comprise contact information for each of at least one contact in the one or more address books;
receive feeds comprising one or more online publications from one or more data sources, wherein each of the one or more online publications comprises a priority score that is based at least partially on an urgency score and a gravity score;
match the one or more online publications with the at least one contact in the one or more address books based at least partially on predefined parameters;
responsive to determining a match, display a notification comprising the match on the user device;
receive a user input comprising user feedback indicating whether the one or more online publications is relevant to the at least one contact, and a request to transmit the match to the at least one contact in the one or more address books;
responsive to the user input, refining a trained machine learning model based at least partially on the user feedback, the trained machine learning model implemented to determine the match; and
responsive to the request, transmitting the match to a second user device corresponding to the at least one contact in the one or more address books.

2. The system of claim 1, wherein the one or more processors is further configured to:
calculate the priority score for each of the one or more online publications; and
determine the match based at least partially on the priority score corresponding to the one or more online publications.

3. The system of claim 1, wherein the one or more processors is further configured to:
extract newsworthy aspects from the contact information corresponding to each of the at least one contact to generate distilled data; and
normalize the distilled data to generate distilled and normalized data corresponding to each of the at least one contact.

4. The system of claim 3, wherein the one or more processors is further configured to:
   prioritize the distilled and normalized data based on predefined parameters.

5. The system of claim 1, wherein the one or more processors is further configured to:
   deduplicate the one or more online publications.

6. The system of claim 1, wherein the one or more processors is further configured to:
   receive an additional request to share the match with the at least one contact; and
   responsive to the additional request, transmitting the match to the at least one contact.

7. The system of claim 6, wherein the additional request comprises user preferences for sharing the match with the at least one contact.

8. A computer-implemented method, comprising the steps of:
   requesting synchronization of one or more address books operated by a user associated with a user device, wherein the one or more address books comprise contact information for each of at least one contact in the one or more address books;
   receiving feeds comprising one or more online publications from one or more data sources, wherein each of the one or more online publications comprises a priority score that is based at least partially on an urgency score and a gravity score;
   matching the one or more online publications with the at least one contact in the one or more address books based at least partially on predefined parameters;
   responsive to determining a match, displaying a notification comprising the match on the user device;
   receiving a user input comprising user feedback indicating whether the one or more online publications is relevant to the at least one contact, and a request to transmit the match to the at least one contact in the one or more address books;
   responsive to the user input, refining a trained machine learning model based at least partially on the user feedback, the trained machine learning model implemented to determine the match; and
   responsive to the request, transmitting the match to a second user device corresponding to the at least one contact in the one or more address books.

9. The method of claim 8, wherein the steps further comprise:
   deduplicating the one or more online publications.

10. The method of claim 8, wherein the steps further comprise:
    calculating the urgency score and the gravity score corresponding to each of the one or more online publications.

11. The method of claim 10, wherein the urgency score is based at least partially on a location in which the one or more online publications takes place, a subject matter associated with the one or more online publications, or a number of people impacted by the one or more online publications.

12. The method of claim 8, wherein the one or more online publications comprises news articles.

13. The method of claim 8, wherein the one or more data sources comprises at least one of news websites, blogs, and social media websites.

14. The method of claim 8, wherein the one or more address books reside at least partially on the user device.

15. The method of claim 8, wherein the steps further comprise:
    extracting newsworthy aspects from the contact information corresponding to each of the at least one contact to generate distilled data; and
    normalizing the distilled data to generate distilled and normalized data corresponding to each of the at least one contact.

16. The method of claim 15, wherein the steps further comprise:
    prioritizing the distilled and normalized data based on predefined parameters.

17. One or more non-transitory computer-readable media storing computer-executable instructions that upon execution cause one or more processors to perform acts comprising:
    requesting synchronization of one or more address books operated by a user associated with a first user device, wherein the one or more address books comprise contact information for each of at least one contact in the one or more address books;
    extracting predefined contact information corresponding to each of at least one contact to generate distilled data;
    normalizing the distilled data to generate distilled and normalized data corresponding to each of at least one contact;
    receiving feeds comprising one or more online publications from one or more data sources, wherein each of the one or more online publications comprises a priority score that is based at least partially on an urgency score and a gravity score;
    matching the one or more online publications with the at least one contact in the one or more address books based one or more attributes corresponding to the one or more online publications and the distilled and normalized data;
    responsive to determining a match, displaying a notification comprising the match to the user, wherein the notification includes a prompt to transmit the match to the at least one contact in the one or more address books;
    receiving a user input comprising user feedback indicating whether the one or more online publications is relevant to the at least one contact, and a request to transmit the match to the at least one contact in the one or more address books;
    responsive to the user input, refining a trained machine learning model based at least partially on the user feedback, the trained machine learning model implemented to determine the match; and
    responsive to the request, transmitting the match to a second user device corresponding to the at least one contact in the one or more address books.

18. The one or more non-transitory computer-readable media of claim 17, wherein the attributes comprise a location, a company, and an industry corresponding to the one or more online publications.

19. The one or more non-transitory computer-readable media of claim 17, wherein the acts further comprise:
    receiving an additional request to share the match with the at least one contact; and
    responsive to the additional request, transmitting the match to the at least one contact.

20. The one or more non-transitory computer-readable media of claim 17, wherein the acts further comprise:
    prioritizing the distilled and normalized data based on predefined parameters.

* * * * *